United States Patent
Borovic et al.

(10) Patent No.: US 7,548,011 B2
(45) Date of Patent: Jun. 16, 2009

(54) SYSTEMS AND METHODS FOR IMPROVED CONTROL OF MICRO-ELECTRICAL-MECHANICAL SYSTEM (MEMS) ELECTROSTATIC ACTUATOR

(75) Inventors: Bruno Borovic, Sunnyvale, CA (US); Frank L. Lewis, Arlington, TX (US); Ai Qun Liu, Singapore (SG); Dan O. Popa, Euless, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 382 days.

(21) Appl. No.: 11/436,411

(22) Filed: May 18, 2006

(65) Prior Publication Data

US 2007/0267939 A1  Nov. 22, 2007

(51) Int. Cl.
H02N 1/00 (2006.01)
(52) U.S. Cl. ....................... 310/309; 318/116
(58) Field of Classification Search ................. 310/309; 318/116; 385/18; 73/514.32; 361/283.1
See application file for complete search history.

(56) References Cited

U.S. PATENT DOCUMENTS

| | | | | |
|---|---|---|---|---|
| 5,998,906 A * | 12/1999 | Jerman et al. | ................ | 310/309 |
| 6,064,997 A | 5/2000 | Jagannathan et al. | .......... | 706/23 |
| 6,133,670 A | 10/2000 | Rodgers et al. | .............. | 310/309 |
| 6,185,469 B1 | 2/2001 | Lewis et al. | .................... | 700/99 |
| 6,611,823 B1 | 8/2003 | Selmic et al. | ................. | 706/14 |
| 6,612,029 B2 * | 9/2003 | Behin et al. | .................... | 29/847 |
| 6,710,507 B2 * | 3/2004 | Murphy | ....................... | 310/309 |
| 6,753,638 B2 | 6/2004 | Adams et al. | ............... | 310/309 |
| 6,825,967 B1 | 11/2004 | Chong et al. | ................. | 359/290 |
| 6,903,486 B2 * | 6/2005 | Jerman et al. | ............... | 310/309 |
| 6,947,657 B1 | 9/2005 | Chen et al. | ................... | 385/140 |
| 6,996,306 B2 * | 2/2006 | Chen et al. | ..................... | 385/18 |
| 7,080,055 B2 | 7/2006 | Campos et al. | ............... | 706/31 |
| 2005/0047721 A1 * | 3/2005 | Chen et al. | ..................... | 385/40 |
| 2007/0267939 A1 * | 11/2007 | Borovic et al. | ............. | 310/309 |
| 2008/0197748 A1 * | 8/2008 | Naftali et al. | ............... | 310/309 |

OTHER PUBLICATIONS

Borovic et al. "The Lateral Instability Problem in Electrostatic Comb Drive Actuators: Modeling and Feedback Control", May 2006, J. Micromech. Microgen. 16 (2006) 1233-1241.*
Elata et al. "Side Pull-in of Individual Comb Drive Fingers", Eurosensors 2005, Sep. 2005, Barcelona, TP29.*
Chiou et al., "Extending the Traveling Range with a Cascade Electrostatic Comb Drive Actuator", Dec. 2007, J. Micromech. Microeng. 18, (2008) (015018)(7pp).*

(Continued)

*Primary Examiner*—Karl I Tamai
(74) *Attorney, Agent, or Firm*—Fulbright & Jaworski LLP (57) ABSTRACT

Methods and apparatuses for sensing and adjusting lateral motion in a comb drive actuated MEMS device are provided. If lateral motion is sensed by a lateral motion sensor coupled to the comb drive actuated MEMS device, and the lateral motion is greater than a reference value, a feedback controller adjusts the lateral motion by providing a drive signal to a comb drive electrode of a comb drive actuator.

11 Claims, 8 Drawing Sheets

OTHER PUBLICATIONS

Borovic et al., "Control Issues for Microelectromechanical Systems", IEEE Control Systems Magazine, Apr. 2006.*

Astrom and Wittenmark, In: *Computer-Controlled Systems: Theory and Design*, 294; 307; 152; Prentice-Hall, Upper Saddle River, 1997, no month provided.

Borovic et al., "Lateral motion control of electrostatic comb drive: new methods in modeling and sensing," *Proc. 16th IASTED Int. Cong. on Modeling & Simulation*, 301-307, May 2005.

Borovic et al., "The lateral instability problem in electrostatic comb drive actuators: modeling and feedback control," *J. Micromech. Microeng.*, 16:1233-1241, May 2006.

Borovic et al., In: "Control of a MEMS Optical Switch," *Proc. 42nd IEEE Intl. Conf. on Decision and Control, CDC, Bahamas*, Dec. 2004.

Borovic et al., "Open-loop versus closed-loop control of MEMS devices: choices and issues," *J. Micromech. Microeng.*, 15:1917-1924, Aug. 2005.

Borovic, "Modeling, actuation, and control of microelectromechanical systems (MEMS)," Doctoral Dissertation presented to faculty of Dept. of Electrical Engineering, The University of Texas at Arlington, Dec. 2005.

Bryzek et al., "Integrating microelectromechanical systems with integrated circuits," *IEEE Instrumentation & Measurement Magazine*, 7(2):51-59, Jun. 2004.

Bryzek et al., In: "Control Issues for MEMS," *Proc. 42nd IEEE Conf. on Decision and Control, HI*, 3:9-12, 2003, no month provided.

Chen and Lee, "Design and modeling for comb drive actuator with enlarged static displacement," *Sensors and Actuators A*, 115:530-539, 2004, no month provided.

Elata et al., "Analytical approach and numberical $\alpha$-lines method ofr pull-in hyper-surface extractino of electrostatic actuators with multiple uncoupled voltage sources," *J. Microeletromech. Syst.*, 12:681-691, Oct. 2003.

Fujita, "Microactuators and micromachines," *Proc. of the IEEE*, 86:1721-1732, Aug. 1998.

Grade et al., "Design of large deflection electrostatic actuators," *J. Microelectromech. Systems*, 12:335-343, Jun. 2003.

Legtenberg et al., "Comb-drive actuators for large displacements," *J. Micromech. Microeng.*, 6:320-329, 1996, no month provided.

Liu et al., "Optical and mechanical models for a variable optical attenuator using a micromirror drawbridge," *Micromech. Microeng*, 13:400-411, Mar. 2003.

Seeger and Boser, "Charge control of parallel-plate, electrostatic actuators and the tip-in instability," *Microeletromech. Syst.*, 12(5):656-671, Oct. 2003.

\* cited by examiner

SYSTEMS AND METHODS FOR IMPROVED CONTROL OF MICRO-ELECTRICAL-MECHANICAL SYSTEM (MEMS) ELECTROSTATIC ACTUATOR

STATEMENT AS TO RIGHTS TO INVENTIONS MADE UNDER FEDERALLY-SPONSORED RESEARCH AND DEVELOPMENT

This invention was made with government support under grant No. DAAD19-02-1-0366 awarded by the Army Research Office and grant No. GOALI BES 0201773 awarded by the National Science Foundation. The government has certain rights in this invention.

BACKGROUND OF THE INVENTION

1. Field of the Invention

The present invention relates generally to Micro-Electrical-Mechanical System (MEMS) technology. More particularly, it concerns improving the useful traveling range of MEMS actuators.

2. Description of Related Art

Micro-electrical-mechanical systems (MEMS) often use actuators to impart motion to, for example, positioning optical devices and switches and for turning gears. Electrostatic actuators are one of several types of actuators used in MEMS, including magnetic piezoelectric, thermal, and optical actuators. When compared to other micro actuators, electrostatic actuators generate force of several micro Newtons (µN) and consume virtually no electrical power.

Figure 1A:
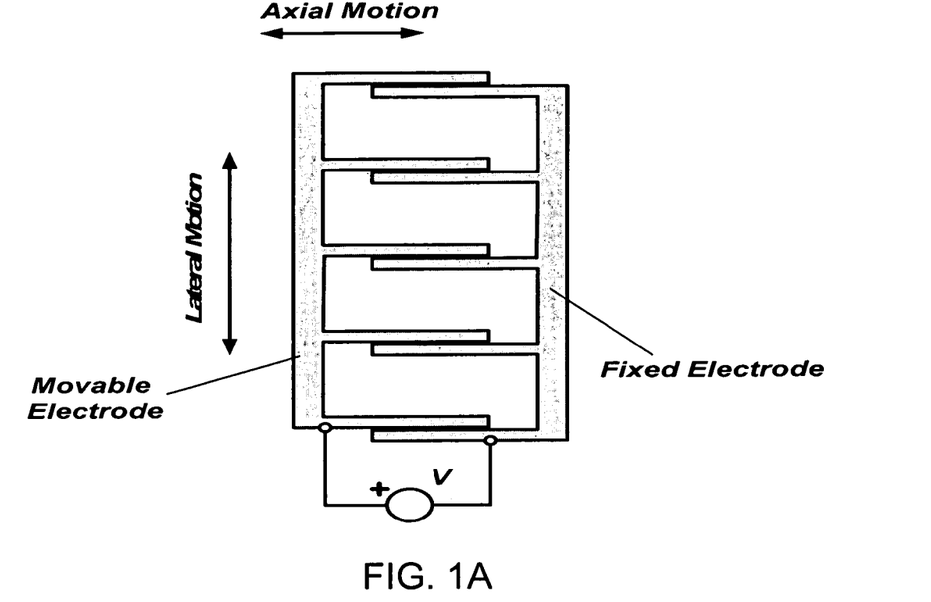
FIG. 1A shows an electrostatic comb drive actuator in the state of lateral instability.

One of the most common electrostatic actuators is a comb drive, which generates a force dependent on the square of the applied voltage. The main issue of the comb drive design is achieving large deflections while minimizing the actuation voltage, resulting in a small deflection-to-size ratio of the actuator. These requirements are typically met by balancing the design of the actuator's suspension and varying the size of the force-generating comb structure. However, comb drives inherently suffer from an electromechanical instability called side pull-in or lateral instability, as illustrated in FIG. 1A. Lateral instability occurs when the electrostatic stiffness transverse to the axial direction of motion exceeds the transverse mechanical stiffness of the suspension. Additionally, although the comb structure is fabricated to be perfectly symmetrical, the comb structure is always unbalanced, causing the neighboring electrodes to contact each other when the voltage-deflection conditions are favorable. Weak suspensions and large forces, designed to achieve large traveling ranges, increase the lateral instability.

To overcome this, the transverse stiffness of the suspension is generally increased. Unfortunately, current suspension stiffening techniques limit the traveling range of the actuator. For example, fabrication techniques such as deep reactive ion etching (DRIE) have allowed the comb structure to be fabricated in single crystal silicon with typical thicknesses of several tenths of microns. These thicker structures can provide larger vertical electrode areas and substantially higher stiffness, but do not improve the limited deflection of comb drive structures.

The shortcoming of conventional methodologies are not intended to be exhaustive, but rather are among many that tend to impair the effectiveness of previously known techniques concerning MEMS actuators. Other noteworthy problems may also exist, however, those mentioned here are sufficient to demonstrate the methodologies appearing in the art have not been altogether satisfactory and that a significant need exists for the techniques described and claimed in this disclosure.

SUMMARY OF THE INVENTION

The present disclosure provides, amongst other things, techniques to minimize or substantially eliminate lateral motion. In one respect, lateral motion in a comb drive actuated MEMS device is sensed and a value corresponding to the lateral motion is provided to a feedback controller. The sensed lateral motion value is compared to a reference value. If the sensed lateral motion value is greater than the reference value, a signal is provided from the feedback controller to a comb drive electrode, and adjusting the lateral motion to substantially zero using the signal.

In other respects, an apparatus is provided. The apparatus may include, amongst other components, a comb drive actuated MEMS device, a plurality of lateral motion sensors, and a feedback controller. The lateral motion sensors may be coupled to the comb drive actuated MEMS device for sensing motion in a lateral direction. The feedback controller, coupled to the lateral motion sensor, may adjust lateral motion in the comb drive actuated MEMS device. In one embodiment, the feedback controller may be configured to provide a drive signal to a comb drive electrode coupled to the comb drive actuated MEMS device.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The figures are examples only. They do not limit the scope of the invention.

DESCRIPTION OF ILLUSTRATIVE EMBODIMENTS

The disclosure and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those of ordinary skill in the art from this disclosure.

The present disclosure provides modeling of a comb actuator and using feedback control to manage axial and lateral motion. In one respect, a novel comb actuator structure with built-in sensors may be provided and allow for feedback control of movements. In one respect, the sensor can sense and distinguish lateral from axial motion, which provides a more effective control of comb drive actuators including control of lateral instability. Additionally, the control system may impact the design of the comb drive, mitigating the requirements on the suspension, lowering the actuation voltage and therefore, decreasing the ratio between size of the actuator and achievable deflection.

Modeling Comb Capacitor Unit (Capacitance and Force)

Figure 1B:
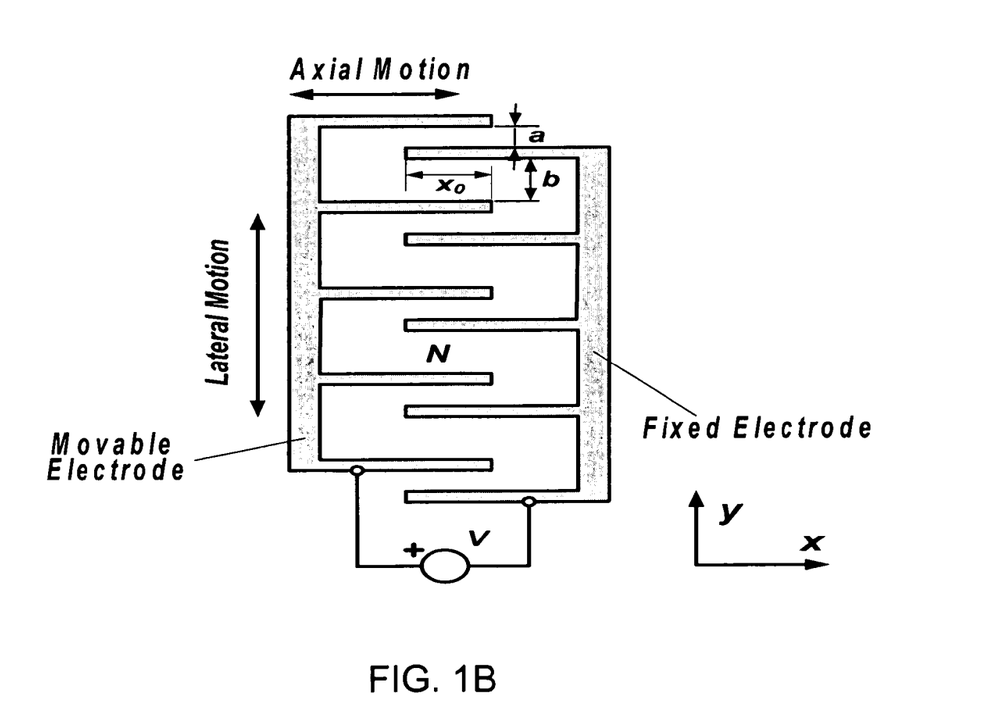
FIG. 1B shows an electrostatic comb capacitor unit, which can be used in accordance with embodiments of this disclosure.

Both generated force and the sensitivity of the comb structure may depend on the capacitance. Therefore, a model of one basic comb capacitor unit, as shown in FIG. 1B, is developed. The capacitance as a function of x and y is given as $$C(x, y) = \varepsilon_0 TN(x_0 + x)\left(\frac{1}{a-y} + \frac{1}{b+y}\right),\quad \text{Eq 1}$$

where N is the number of finger electrodes of the each comb drive, $\varepsilon_0$ is the permittivity of the vacuum, T is the thickness of the structure and $x_0$ is initial overlapping between the fingers.

The partial derivatives of the capacitance of Eq. 1 with respect to x and y are given as follows $$\frac{\partial C}{\partial x} = \varepsilon_0 TN\left(\frac{1}{a-y} - \frac{1}{b+y}\right). \quad \text{Eq 2}$$

$$\frac{\partial C}{\partial y} = \varepsilon_0 TN(x_0 + x)\left(\frac{1}{(a-y)^2} - \frac{1}{(b+y)^2}\right). \quad \text{Eq 3}$$

If voltage V is applied between two electrodes, the force generated in x and y direction is given as $$F_x = \frac{1}{2}\frac{\partial C}{\partial x}V^2 = \frac{1}{2}\varepsilon_0 TN\left(\frac{1}{a-y} - \frac{1}{b+y}\right)V^2. \quad \text{Eq 4}$$

$$F_y = \frac{1}{2}\frac{\partial C}{\partial y}V^2 = \frac{1}{2}\varepsilon_0 TN(x_0 + x)\left(\frac{1}{(a-y)^2} - \frac{1}{(b+y)^2}\right)V^2. \quad \text{Eq 5}$$

Every capacitance and force calculated for various comb capacitor structures in this disclosure represents an extension of this concept.

Modeling the MEMS Device with Comb Actuators

Figure 2A:
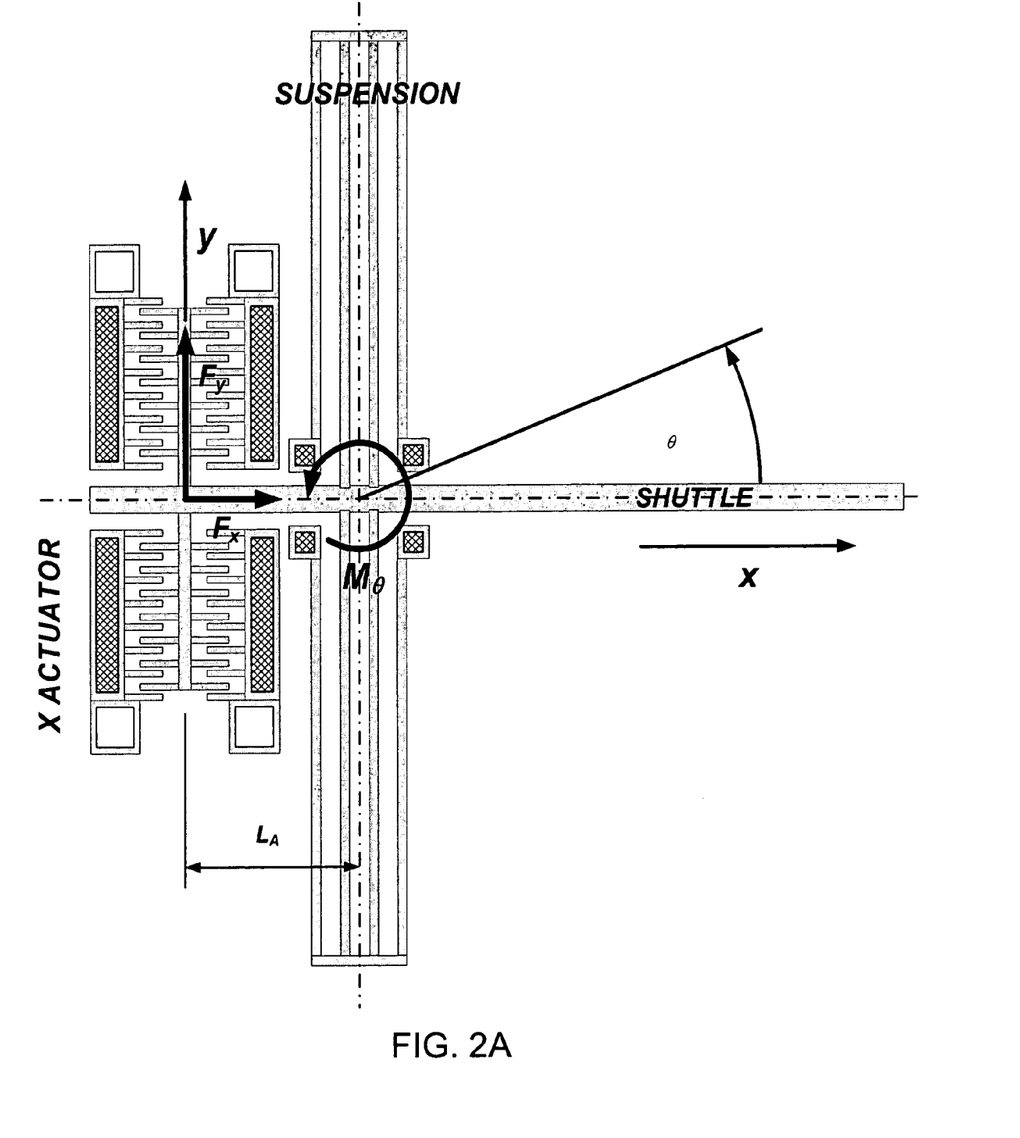
FIG. 2A shows a MEMS device actuated by comb-drive actuator, which can be used in accordance with embodiments of this disclosure.

Referring to FIG. 2A, a MEMS device actuated by a comb drive actuator fabricated using a deep reactive ion etching (DRIE) technique is shown. The MEMS device may include, without limitation, a body of the device known as a shuttle, an electrostatic comb drive actuator coupled to the shuttle and configured to create a force in the x direction and torque around z axis, a suspension, and two sensors (shown as capacitive sensors) for sensing both x and y deflections. The suspension may be coupled to the shuttle at one distal end and a substrate at the other distal end, enabling limited movements and electrical connection.

It is noted that the MEMS device shown in FIG. 2A is an exemplary embodiment and one of ordinary skill in the art would recognize that the MEMS device may include other configurations, e.g., size, shape, type, etc. Additionally, the MEMS device may include more than one comb actuator (with appropriate controller relative to the dynamics of the device).

For the purpose of illustrating how feedback stabilizes lateral motion of the device, a model is derived, where the parameters of the lateral degree of freedom (DOF) model are analyzed using a combined finite element analysis (FEA) and static experimental results. Use of a model to design a controller does not affect the ability of the controller to stabilize lateral motion. However, the lateral motion significantly contributes to the simplicity and straightforwardness of the controller design.

In one embodiment, the device shown in FIG. 2A may be modeled as two second-order differential equations describing two degrees of freedom, axial displacement along x axis, and rotation around z axis. The dynamic model of the comb drive actuator can be written as $$m_x\ddot{x}+d_x\dot{x}+k_x x=F_x \quad \text{Eq. 7}$$

$$J_z\ddot{\theta}+d_\theta\dot{\theta}+k_\theta\theta=M_z \quad \text{Eq. 8}$$

where $m_x$ and $J_z$ are the effective moving mass along the x-axis and the effective moment of inertia around the z-axes, respectively. Variables $d_x$ and $d_\theta$ describe damping, and $k_x$ and $k_\theta$ are the stiffnesses along the x-axis and around the z-axis, respectively.

It can be seen that $\theta$ is small during the operation of the device. In the other words, a y-direction movement of the comb structure is smaller than the radius of rotation, i.e. $y \ll L_A$. Hence, the approximation of $tg\theta = y/L_A \approx \theta$ may be assumed, and thus, modifying Eq. 8 to $$\frac{J_z}{L_A^2}\ddot{y} + \frac{d_\theta}{L_A^2}\dot{y} + \frac{k_\theta}{L_A^2}y = -F_Y, \qquad \text{Eq. 9}$$

where Eqs. 7 and 9 represent the dynamics of the comb drive actuator in a two DOF.

Forces $F_x$ and $F_y$ from Eqs 7 and 9 may be determined as a contribution of all forces generated by comb capacitors, such as one shown in FIG. 1B, acting on the MEMS device. For example, the structure shown in FIG. 2a has four (n=4) comb capacitances such that $$F_x = \sum_n F_{xCn} = F_{xC1} + F_{xC2} + F_{xC3} + F_{xC4} \qquad \text{Eq. 10}$$

$$F_y = \sum_n F_{yCn} = F_{yC1} + F_{yC2} + F_{yC3} + F_{yC4} \qquad \text{Eq. 11}$$

where n is the number of comb capacitor units. Each of eight forces from Eqs. 10 and 11 can been determined following the procedure shown in Eqs. 1 through 5.

For typical MEMS application, it may be desirable that lateral y force from Eq. 11 does not exist (e.g., $F_y = 0$). However, due to various imperfections, $F_y$ generally is not equal to zero. Lateral instability occurs if lateral force becomes large enough to overcome lateral stiffness.

Figure 3:
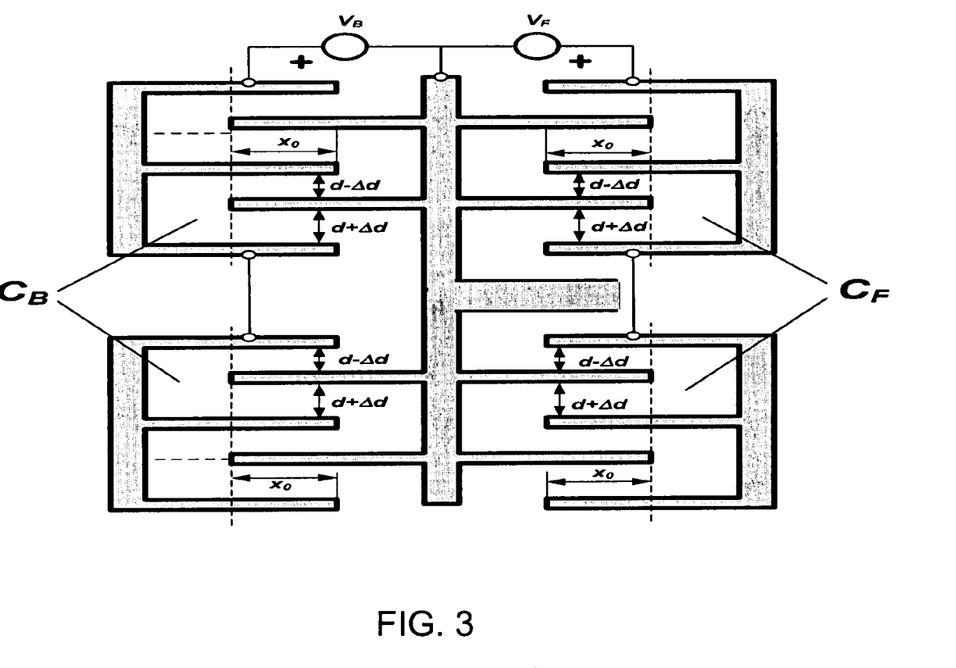
FIG. 3 shows unbalanced comb-drive actuators and capacitors, which can be used in accordance with embodiments of this disclosure.

One of the reasons for unsymmetrical lateral force is unsymmetrical geometry. To model this, a virtually symmetrical comb drive actuator is modeled as an unbalanced one by introducing $\Delta d$, as shown in FIG. 3.

In order to determine total forces $F_x$ and $F_y$ from Eqs. 7 and 9, the procedure from Eqs. 1-5 may be used. The capacitances $C_F$ and $C_B$ are composed of two comb capacitance units as the one shown in FIG. 1B and can be expressed as a function position x and y as:

$$C_F(x, y) = N\varepsilon_0 T(x + x_0)\left(\frac{1}{d - \Delta d - y} + \frac{1}{d + \Delta d + y}\right) \qquad \text{Eq. 12}$$

$$C_B(x, y) = N\varepsilon_0 T(-x + x_0)\left(\frac{1}{d - \Delta d - y} + \frac{1}{d + \Delta d + y}\right) \qquad \text{Eq. 13}$$

where $C_F$ and $C_B$ are capacitances generating forward and backward force capacitances with respect to the axial direction.

With the capacitances from Eqs. 12 and 13, the force in the x direction, $F_x$, and the force in the y direction, $F_y$, are calculated in a similar fashion as they were in Eqs. 4 and 5 for the drive unit shown in FIG. 1B. In one embodiment, $F_x$ and $F_y$ are calculated as follows:

$$F_x = \frac{1}{2}\frac{\partial C_F}{\partial x}V_F^2 + \frac{1}{2}\frac{\partial C_B}{\partial x}V_B^2 = \qquad \text{Eq. 14}$$
$$\frac{1}{2}N\varepsilon_0 T\left(\frac{1}{d - \Delta d - y} + \frac{1}{d + \Delta d + y}\right)(V_F^2 - V_B^2)$$

$$F_y = \frac{1}{2}\frac{\partial C_F}{\partial y}V_F^2 + \frac{1}{2}\frac{\partial C_B}{\partial y}V_B^2 = \qquad \text{Eq. 15}$$
$$\frac{1}{2}N\varepsilon_0 T\left[\frac{1}{(d - \Delta d - y)^2} - \frac{1}{(d + \Delta d + y)^2}\right]$$
$$[x_0(V_F^2 + V_B^2) + x(V_F^2 - V_B^2)]$$

where $V_F$ and $V_B$ are the forward- and backward-driving voltages shown in FIG. 3. Notice that if $\Delta d = 0$ and $y = 0$, the lateral force does not exist. A typical MEMS device employing a comb drive actuator is designed to work this way. Eqs. 7, 8, 14 and 15 represent the model of the MEMS device shown in FIG. 2A with an unbalanced actuator that causes lateral instability if a voltage and axial deflection condition is favorable.

Additional Comb Structures with Lateral Sensing and Actuation

Figure 2B:
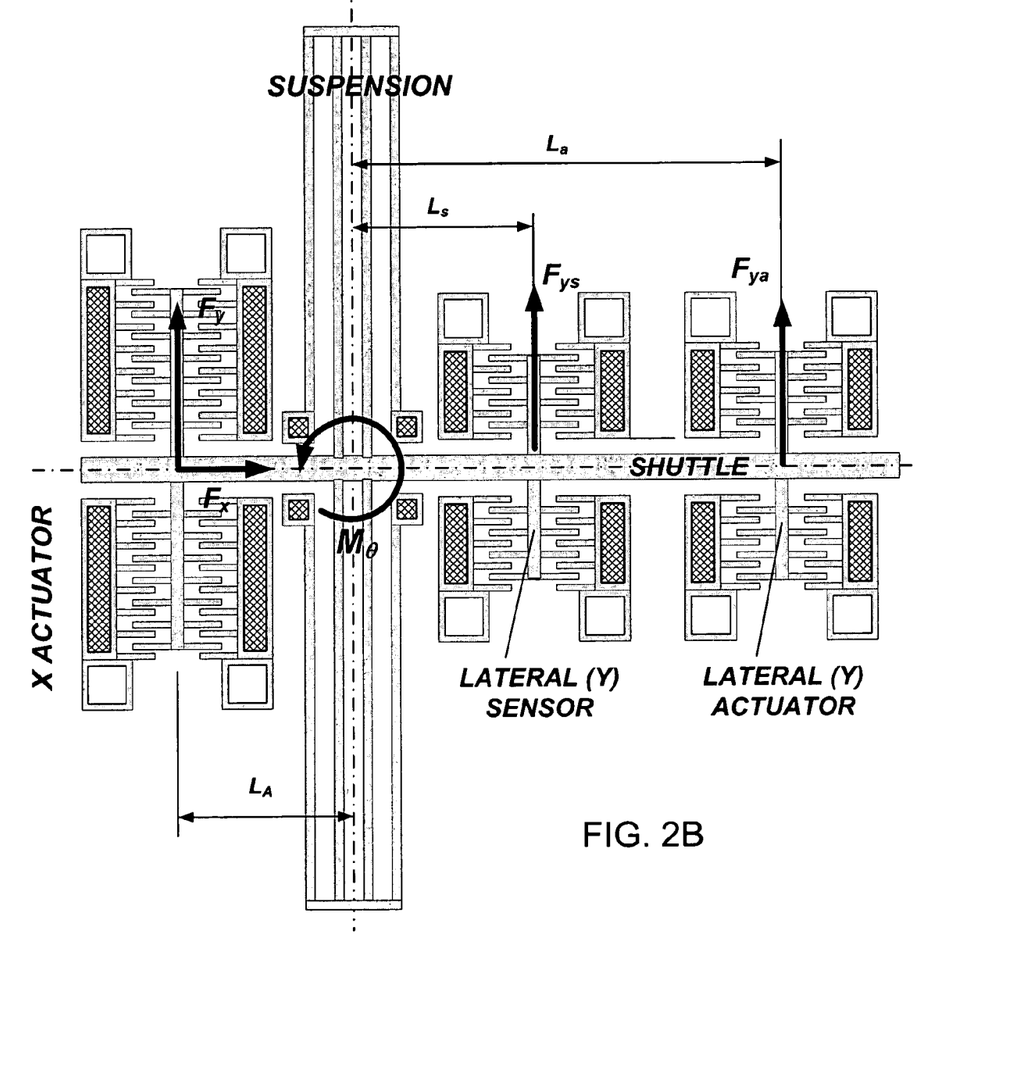
FIG. 2B shows MEMS device actuated by comb-drive actuator with additional lateral comb actuator and lateral comb sensor, in accordance with embodiments of this disclosure.

FIG. 2B shows the MEMS device with comb actuator of FIG. 2A with additional comb drives and a sensor for lateral motion. In one embodiment, the structure including both the actuator and sensor may allow substantially zero force generated in x-direction. The lateral actuator may be based on a four-element actuation structure that allows the generation of positive and negative forces in the lateral direction. The lateral sensor may be based on a four-element bridge structure that allows the discrimination of positive and negative motion in the lateral direction.

The lateral comb-like structures in FIG. 2B may include both movable and fixed electrodes. Voltage $V_{aT}$ applied to the actuating electrodes may cause generation of electrostatic forces and movement of the device. Motion is sensed by connecting the capacitive sensors to bridges and observing the capacitance change on the fixed electrodes.

Figure 4:
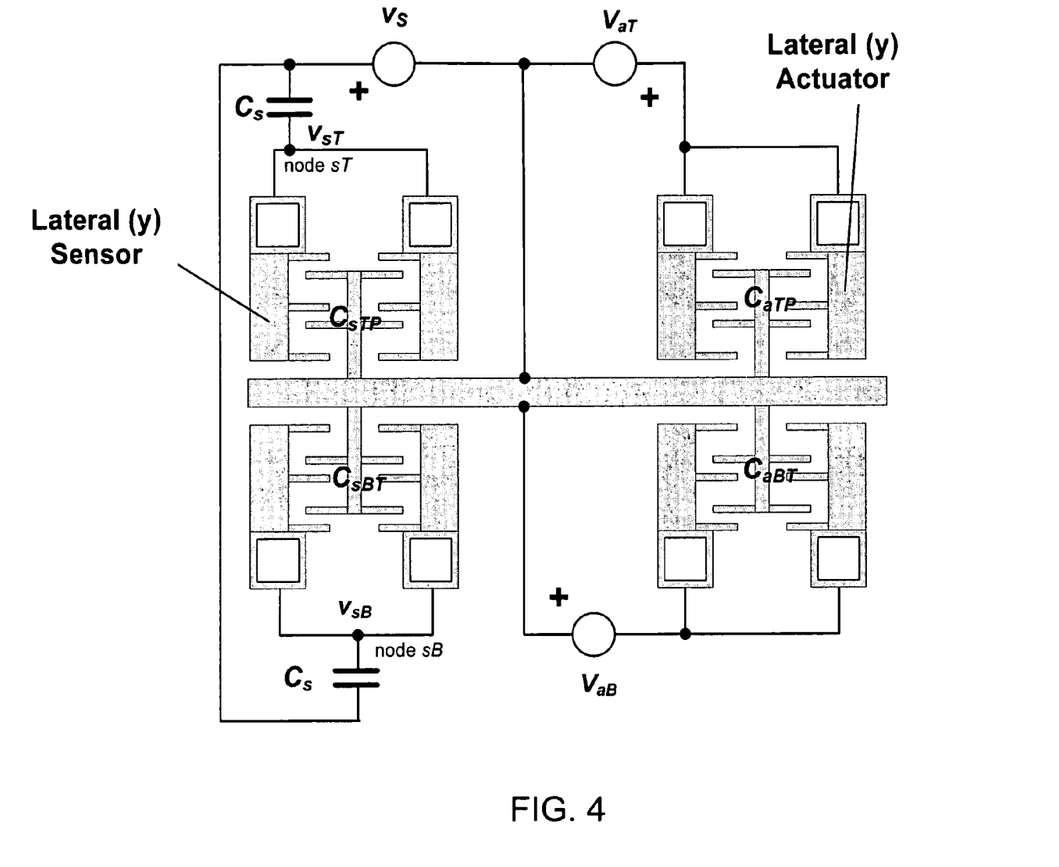
FIG. 4 shows detailed lateral comb-drive actuator and lateral comb sensor with corresponding capacitances, in accordance with embodiments of this disclosure.

The lateral actuators can include top and bottom comb drive structures designed to generate force in the y direction. These comb drive structures are unbalanced with unequal gaps (a and b) between the electrodes, as shown in FIG. 4. The maximum generated force per comb area occurs when the ratio between the smaller and the larger electrode gap. For example, the ratio between a and b is about 0.42, although other ratios may be suitable. The smallest gaps are defined by the minimum processing geometry, e.g., if minimum processing gap is 2.5 µm, gap is then about 2.5 µm wide and b is about 6 µm wide, although other dimensions can be used.

The lateral sensor has a similar gap geometry in order to achieve maximum sensitivity. The number of fingers, N, and the initial electrode overlapping, $x_0$, may be different than with the lateral actuator. Movable capacitors are connected to the bridge structure through serial capacitors. Deflection in the y-direction can be determined from the difference between voltages.

Similar to the unbalanced comb actuator on the MEMS device shown in FIG. 2A, the actuator of FIG. 2B may also be modeled using Eqs. 12 through 15. Additionally, the force generated by the lateral actuator and lateral sensor shown in FIG. 2B may further be modeled in a similar fashion. The capacitance of the two parallel top actuating capacitors, $C_{TP}$, with respect to the x- and y-directions is given as:

$$C_{TPa}(y) = 2\varepsilon_0 TN_a x_{a0} \left( \frac{1}{a-y} + \frac{1}{b+y} \right)$$ Eq. 16

Similarly, the two parallel bottom capacitances, $C_{BT}$, are given as:

$$C_{BTa}(y) = 2\varepsilon_0 TN_a x_{a0} \left( \frac{1}{a+y} + \frac{1}{b-y} \right)$$ Eq. 17

Both capacitances in Eqs. 17 and 18 do not depend on x. Consequently, their contribution to the force along x-axis does not exist. The unbalance coefficient Δd is omitted for the case of a lateral actuator and sensor, because it is assumed that the sensing voltage is too low to influence lateral instability, and the actuation voltage is assumed to be an issue for the controller.

The total force in the lateral direction, $F_{ya}$, may be calculated using a similar procedure as in Eqs. 14 and 15

$$F_{ya} = \varepsilon_0 TN_a x_{a0} \left[ \left( \frac{1}{(a-y)^2} - \frac{1}{(b+y)^2} \right) V_{aT}^2 + \left( \frac{1}{(b-y)^2} - \frac{1}{(a+y)^2} \right) V_{aB}^2 \right]$$ Eq. 18

Following a similar procedure, sensing comb capacitances and force generated by the capacitances are modeled as:

$$C_{TPs}(y) = 2\varepsilon_0 TN_s x_{s0} \left( \frac{1}{a-y} + \frac{1}{b+y} \right)$$ Eq. 19

$$C_{BTs}(y) = 2\varepsilon_0 TN_s x_{s0} \left( \frac{1}{a+y} + \frac{1}{b-y} \right)$$ Eq. 20

$$F_{ys} = \varepsilon_0 TN_s x_{s0} \left[ \left( \frac{1}{(a-y)^2} - \frac{1}{(b+y)^2} \right) V_{sT}^2 + \left( \frac{1}{(b-y)^2} - \frac{1}{(a+y)^2} \right) V_{sB}^2 \right]$$ Eq. 21

Now, the actuating and sensing forces in Eqs. 18 and 21 are integrated into the model in Eqs. 7, 9, 10, and 11 for the device from FIG. 2B, and the model is $$\frac{J_z}{L_A^2}\ddot{y} + \frac{d_\theta}{L_A^2}\dot{y} + \frac{k_\theta}{L_A^2}y = -F_Y + \frac{L_a}{L_A}F_{ya} + \frac{L_s}{L_A}F_{ys}$$ Eq. 22

Additionally, the lateral sensor model shown in FIG. 2B may further be modeled where the lateral position sensing shown in FIG. 4 is based on the difference between capacitances $C_{TPs}$ and $C_{BTs}$ from Eqs. 19 and 20. As the purpose of the overall system is keeping lateral motion at or about substantially zero, capacitance changes can be linearized around y=0 where $$\Delta C_{Sense} = C_{TPs} - C_{BPs} = \left( \frac{\partial C_{TPs}}{\partial y} \right)_{y=0} \Delta y - \left( \frac{\partial C_{BPs}}{\partial y} \right)_{y=0} \Delta y$$ Eq. 23

-continued $$\left( \frac{\partial C_{TPs}}{\partial y} \right)_{y=0} =$$ Eq. 24

$$\left[ 2\varepsilon_0 TN_s x_{s0} \left( \frac{1}{(a-y)^2} - \frac{1}{(b+y)^2} \right) \right]_{y=0} = 2\varepsilon_0 TN_s x_{s0} \left( \frac{1}{a^2} - \frac{1}{b^2} \right)$$

$$\left( \frac{\partial C_{BTs}}{\partial y} \right)_{y=0} =$$ Eq. 25

$$\left[ 2\varepsilon_0 TN_s x_{s0} \left( \frac{1}{(b-y)^2} - \frac{1}{(a+y)^2} \right) \right]_{y=0} = 2\varepsilon_0 TN_s x_{s0} \left( \frac{1}{b^2} - \frac{1}{a^2} \right)$$

Introducing Eqs. 24 and 25 into Eq. 23 yields $$\Delta C_{Sense} = \frac{4\varepsilon_0 TN_s x_{S0}}{a^2 b^2}(b^2 - a^2)\Delta y = K_{C\Delta y}\Delta y$$ Eq. 26

Eq. 26 may be rewritten as $\Delta C_{Sense} = K_{C\Delta y} y$ assuming substantially small y.

A differential change in capacitance can be sensed by a properly designed voltage amplifier coupled between $V_{sT}$ and $V_{sB}$ shown in FIG. 4. Additionally, the same or a similar sensor bridge configuration can be used to measure $\Delta C_{sense}$ by measuring the charge between sT and sB nodes with a differential charge amplifier.

A sense bridge is designed so that all motion except motion in the y direction (or around the z axis) is rejected. Motion in the x direction may be cancelled by adding symmetrical structure pointing into the negative direction of x. Eqs. 19 and 20 show this embodiment clearly. Any out of plane motion affects both the top and bottom part of the sensor in the same way, therefore canceling it. Sensitivity may change only for the case when Δy (or y) is relatively large, and this typically does not happen because the controller is assumed to keep lateral motion substantially small.

Feedback Control Design

In one embodiment, the present disclosure provides a feedback approach that prevents lateral pull-in and extends the working range of the comb drive actuator in the primary x-direction DOF. The primary requirement for the controller is to keep movement in the y-direction at substantially zero. Additional shaping of the dynamics may also be desirable.

Figure 5:
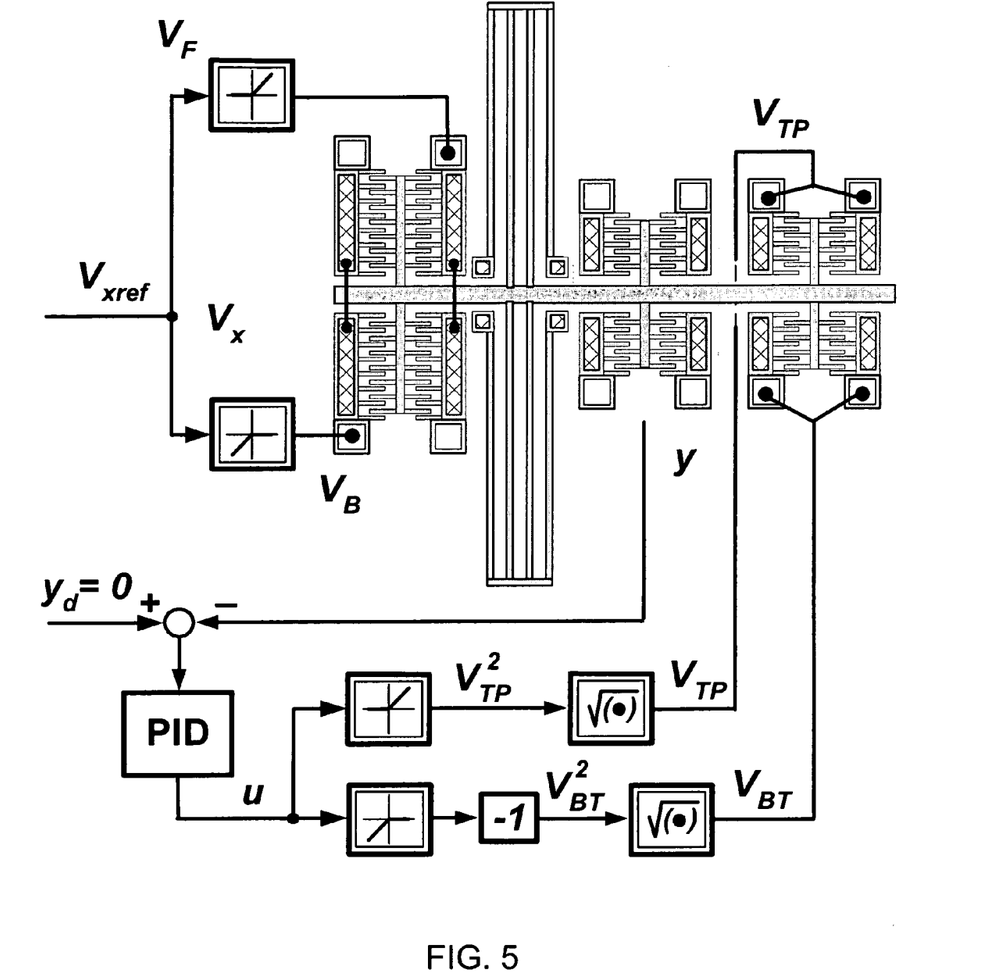
FIG. 5 shows a lateral movement controller, in accordance with embodiments of this disclosure.
Figure 6A:
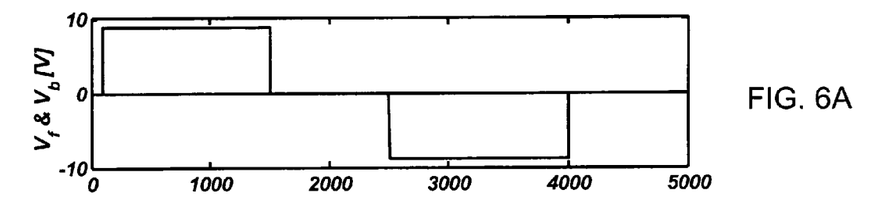
FIGS. 6A, 6B, 6C, and 6D show simulations of dynamic behavior of a comb-drive system, in accordance with embodiments of this disclosure.
Figure 6B:
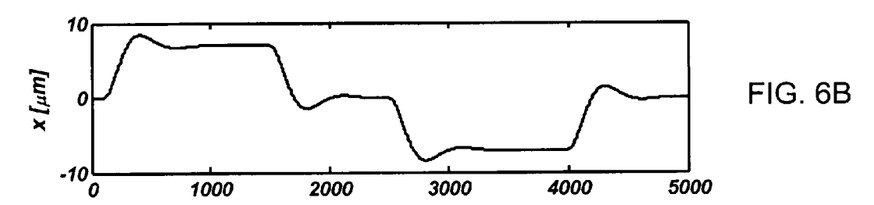
Figure 6C:
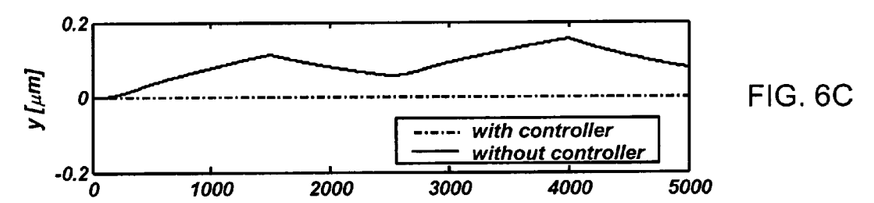
Figure 6D:
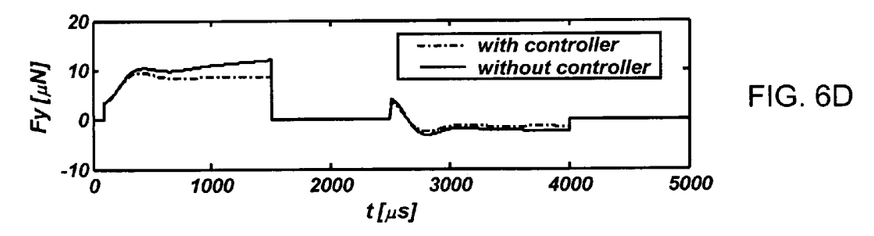

The structure of an example controller is shown in FIG. 5. In order to simplify the analysis, a proportional-integral-derivative (PID) controller is implemented for the lateral DOF. Other controllers that include an integral behavior, i.e., having the ability to force steady-state control error to be substantially small, may be used instead of or in combination with the PID controller. For example, any PI or PID controller with or without gain scheduling accounting for axial x deflection, state space controllers with integral behavior, and the like may be used.

In other embodiments, controllers with features for implementing gain scheduling for square voltages may be used. In one embodiment, it is assumed that the lateral motion Δy is measurable and available. When the lateral feedback loop is closed, the sensed value of y is compared to the reference $y_d$=0 and the error signal may be passed through the PID controller. Saturation-type nonlinearities distribute voltages to the two channels (1302 and 1304 of FIG. 5) leading to the top and bottom y-direction comb drive electrodes, respectively. In one embodiment, the signal may be taken through the square root functions that take care of the electrostatic force being dependent on the squared value of the voltage.

In order to keep the controller as simple as possible, the lateral degree of freedom can be expressed as:

$$\frac{J_z}{L_A^2}\ddot{y} + \frac{d_\theta}{L_A^2}\dot{y} + \frac{k_\theta}{L_A^2}y = \frac{L_a}{L_A}F_{ya} + F_D \qquad \text{Eq. 27}$$

where all lateral forces except the actuator one as a disturbance to the system, $F_D$ are considered.

Furthermore, for y=0, Eq. 16 yields:

$$F_{ya} = \varepsilon_0 T N_A x_{A0}\left(\frac{b^2-a^2}{a^2b^2}V_{aT}^2 + \frac{a^2-b^2}{a^2b^2}V_{aB}^2\right) \qquad \text{Eq. 28}$$

Merging Eqs. 27 and 28 and defining $k_{ab}=(b^2-a^2)/(ab)^2$, yields:

$$\frac{J_z}{L_A^2}\ddot{y} + \frac{d_\theta}{L_A^2}\dot{y} + \frac{k_\theta}{L_A^2}y = \qquad \text{Eq. 29}$$

$$\frac{L_a}{L_A}\varepsilon_0 T N_a x_{a0} k_{ab}(V_{aT}^2 - V_{aB}^2) = k_L(V_{aT}^2 - V_{aB}^2),$$

where $k_L = \eta(L_a/L_A)\varepsilon_0 T N_a x_{a0} k_{ab}$.

As noted above, in one embodiment, the controller may be a PID type, with a gain scheduling applied to account for voltage-squared term, i.e. square root from Eq. 30, as given by $$u = -Py - D\frac{dy}{dt} - I\int_0^\tau y(\tau)d\tau \qquad \text{Eq. 30}$$

$$V_{aT} = \sqrt{u} \quad u \geq 0, \quad V_{aB} = \sqrt{-u} \quad u < 0.$$

In one embodiment, parameters of the controller (Eqs. 28 and 29) may be as P=7.5×10³ V²m⁻¹, D=5×10⁻² sV²m⁻¹, and I=7.5×10⁸ V²m⁻¹s⁻¹, although other suitable variables are may used.

Referring to FIGS. 6A-6D, simulation results for a test embodiment without and with a controller at the edge of the lateral instability is shown where an 8.96V signal was applied to the comb drive. The controller takes care of the lateral motion, not allowing the actuator to rotate around the z-axis.

Figure 7A:
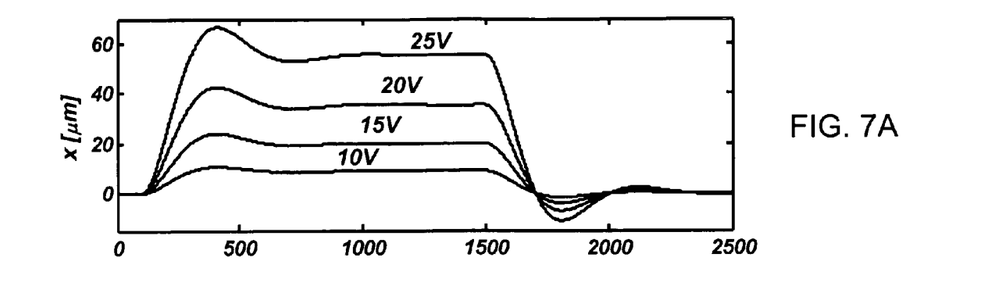
FIGS. 7A, 7B, and 7C show simulations of dynamic behavior of a comb driver system with various applied voltages, in accordance with embodiments of this disclosure.
Figure 7B:
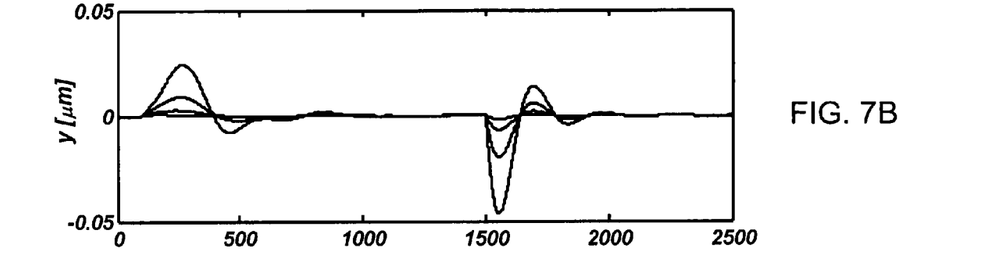
Figure 7C:
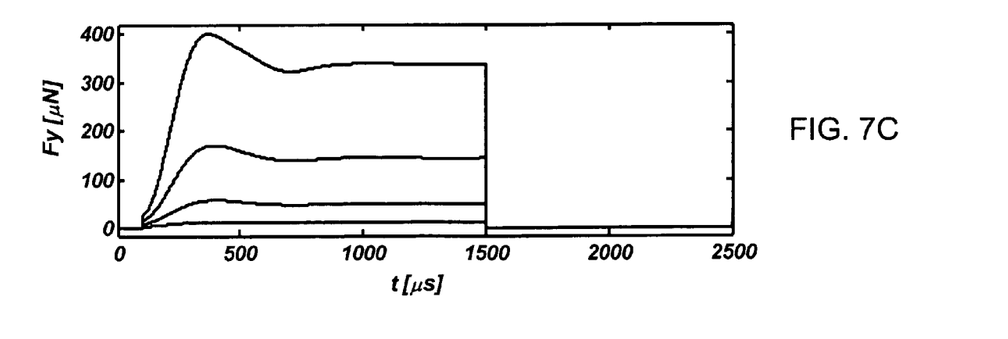

A set of simulations are shown in FIGS. 7A-7C of a test embodiment where different voltages greater than or equal to the pull-in value have been applied to the actuator. It can be seen that the controller keeps the lateral motion at substantially zero. Achievable deflections may depend on how much force the lateral steering actuators can provide, and their values are several times larger than the maximum deflection in the uncontrolled case.

With the benefit of the present disclosure, those having ordinary skill in the art will comprehend that techniques claimed here may be modified and applied to a number of additional, different applications, achieving the same or a similar result. The claims cover all such modifications that fall within the scope and spirit of this disclosure.

REFERENCES

Each of the following references is incorporated by reference in its entirety:

B. Borovic, F. L. Lewis, A. Q. Liu, E. S. Kolesar, D. O. Popa, The lateral instability problem in electrostatic comb drive actuators: modeling and feedback control, *J. Micromech. Microeng.* 16 (2006) 1233-1241.

Borovic et al., In: *Lateral Motion Control of Electrostatic Comb Drive: New Methods in Modeling and Sensing*, 16th IASTED Intl. Conf. Modeling and Simulation, Cancun, MX, 2005.

Bryzek et al., In: *Control Issues for MEMS*, Proc. 42nd IEEE Conf. on Decision and Control, HI, 3:9-12, 2003.

Grade et al, *J. Microelectromech. Systems*, 12(3):335-343, 2003.

Fujita, *Proc. of the IEEE*, 86(8):1721-1732, 1998.

Borovic et al., In: *Control of a MEMS Optical Switch*, Proc. 42nd IEEE Intl. Conf. on Decision and Control, CDC, Bahamas, 2004.

Liu et al., *Micromech. Microeng*, 13:400-411, 2003.

Legtenberg et al., *Micromech. Microeng.*, 6:320-329, 1996.

Elata et al., *Microeletromech. Syst.*, 12:681-691, 2003.

Chen and Lee, *Sensors and Actuators A*, 115:530-539, 2004.

Grade, In: *Large deflection, high speed, electrostatic actuators for optical switching applications*, Mechanical Engineering, Stanford, 232, 1999.

Borovic et al., *J. Micromech. Microeng.*, 15:1917-1924, 2005.

Senturia, In: *Microsystem Design*, Kluwer Academic Publ., ISBN: 0792372468, 2000.

Elswenpoek and Wiegerink, In: *Mechanical Microsensors*, ISBN: 3540675825, Springer-Verlag, Berlin, 2001.

Astrom and Wittenmark, In: *Computer-Controlled Systems: Theory and Design*, 294; 307; 152; Prentice-Hall, Upper Saddle River, 1997.

Bryzek et al., *IEEE*, 7(2):51-59, 2004.

Seeger and Boser, *Microeletromech. Syst.*, 12(5):656-671, 2003.

Franco, In: *Design with operational amplifiers and analog integrated circuits*, McGraw-Hill Ed., Asia, 2002.

The invention claimed is:

1. A method comprising:
    sensing lateral motion associated with a comb drive actuated MEMS device;
    providing a value corresponding to the sensed lateral motion to a feedback controller;
    comparing the sensed lateral motion value with a reference value;
    providing a signal if the sensed lateral motion value is greater than the reference value, the signal being provided from the feedback controller to a comb drive electrode; and
    adjusting the lateral motion to substantially zero using the signal.

2. The method of claim 1, where the reference value is equal to substantially zero.

3. The method of claim 1, further comprising computing an electrostatic force of the signal based on the squared value of an input voltage applied to the comb drive actuator.

4. The method of claim 1, where sensing lateral motion comprises determining capacitance variance.

5. The method of claim 4, where the sensed lateral motion value comprises a capacitance value.

6. The method of claim 4, further comprising determining a plurality of comb capacitances in the comb drive actuator.

7. An apparatus, comprising:
- a comb drive actuated MEMS device;
- a plurality of lateral motion sensors coupled to the comb drive actuated MEMS device for sensing motion in a lateral direction;
- a feedback controller coupled to the lateral motion sensors for adjusting lateral motion in the comb drive actuated MEMS device, the feedback controller being configured to provide a drive signal to a comb drive electrode coupled to the comb drive actuated MEMS device.

8. The apparatus of claim 7, the feedback controller comprising a proportional-integral-derivative controller.

9. The apparatus of claim 7, the plurality of lateral motion sensors being configured in a bridge configuration.

10. The apparatus of claim 7, the plurality of lateral motion sensors comprising a plurality of capacitance sensors.

11. The apparatus of claim 7, the feedback controller being configured to adjust lateral motion in the comb drive actuator to substantially zero.

* * * * *